US008979086B2

(12) United States Patent
Phillips

(10) Patent No.: US 8,979,086 B2
(45) Date of Patent: Mar. 17, 2015

(54) METHOD AND APPARATUS FOR SECURING A WORKPIECE TO A FIXTURE PLATE USING A NOVEL WORKPIECE HOLD-DOWN CLAMP

(76) Inventor: Steven E. Phillips, Boylston, MA (US)

( * ) Notice: Subject to any disclaimer, the term of this patent is extended or adjusted under 35 U.S.C. 154(b) by 632 days.

(21) Appl. No.: 13/029,695

(22) Filed: Feb. 17, 2011

(65) Prior Publication Data

US 2011/0210494 A1 Sep. 1, 2011

Related U.S. Application Data

(60) Provisional application No. 61/338,286, filed on Feb. 17, 2010.

(51) Int. Cl.
*B23Q 3/02* (2006.01)
*B25B 5/06* (2006.01)

(52) U.S. Cl.
CPC ........... *B25B 5/068* (2013.01); *Y10T 29/49998* (2015.01)
USPC .......................................................... 269/134

(58) Field of Classification Search
USPC ................... 269/24, 32, 228, 95, 289 R, 303; 254/100, 103
See application file for complete search history.

(56) References Cited

U.S. PATENT DOCUMENTS

| | | | | | |
|---|---|---|---|---|---|
| 416,096 | A | * | 11/1889 | Dom | 269/166 |
| 2,779,275 | A | | 1/1957 | Spainhour | |
| 3,296,763 | A | | 1/1967 | Curl | |
| 4,157,819 | A | | 6/1979 | Meyer | |
| 4,261,558 | A | | 4/1981 | Carossino | |
| 4,622,822 | A | | 11/1986 | Beitner | |
| 4,653,953 | A | * | 3/1987 | Anderson et al. | 403/268 |
| 4,759,488 | A | | 7/1988 | Robinson et al. | |
| 4,915,367 | A | | 4/1990 | Carossino | |
| 4,928,917 | A | * | 5/1990 | Wolf | 248/507 |
| 5,026,033 | A | * | 6/1991 | Roxy | 269/45 |
| 5,305,992 | A | * | 4/1994 | Kish | 269/51 |
| 5,979,110 | A | * | 11/1999 | Tai | 47/41.01 |
| 6,435,496 | B1 | | 8/2002 | Phillips | |
| 2010/0064488 | A1 | | 3/2010 | Li et al. | |
| 2011/0193282 | A1 | | 8/2011 | Phillips | |

* cited by examiner

*Primary Examiner* — Lee D Wilson
*Assistant Examiner* — Nirvana Deonauth
(74) *Attorney, Agent, or Firm* — Pandiscio & Pandiscio

(57) ABSTRACT

A workpiece hold-down clamp for securing a workpiece to a fixture plate, the workpiece hold-down clamp comprising: a clamp post for mounting to the fixture plate; and a clamp finger which is adjustably mounted to the clamp post, wherein the clamp finger is configured for selective movement along the clamp post, and wherein the clamp finger comprises a portion for engaging the workpiece; wherein the clamp finger comprises a cantilever beam which is flexible.

18 Claims, 14 Drawing Sheets

METHOD AND APPARATUS FOR SECURING A WORKPIECE TO A FIXTURE PLATE USING A NOVEL WORKPIECE HOLD-DOWN CLAMP

REFERENCE TO PENDING PRIOR PATENT APPLICATION

This patent application claims benefit of prior U.S. Provisional Patent Application Ser. No. 61/338,286, filed Feb. 17, 2010 by Steven E. Phillips for WORKPIECE CLAMP/HOLD DOWN, which patent application is hereby incorporated herein by reference.

FIELD OF THE INVENTION

This invention relates to workpiece clamps in general, and more particularly to workpiece hold-down clamps for holding a workpiece down against a fixture plate during manufacturing quality inspections and the like.

BACKGROUND OF THE INVENTION

Workpiece hold-down clamps are used to secure a workpiece to a fixture plate during machining, measurement, inspection, etc. More particularly, workpiece hold-down clamps apply a downward force to the top surface of a workpiece so as to force the workpiece downwardly against the top surface of the fixture plate, whereby to hold the workpiece in position on the fixture plate.

One particular type of workpiece hold-down clamp is designed to secure a workpiece to a fixture plate during manufacturing quality inspections, i.e., where the workpiece must be held stationary while it is measured and/or otherwise inspected. With this type of workpiece hold-down clamp, the clamp must generate sufficient force ("light-duty") to hold a workpiece securely in place on the fixture plate while the workpiece is inspected (e.g., with a coordinate measuring machine, optical comparator, etc.), but the workpiece hold-down clamp does not need to generate the high level of force ("heavy-duty") that would be required during a metal stock removal operation (e.g., machining, drilling, etc.). In this respect it will be appreciated that reliably securing the workpiece to the fixture plate during inspection is generally quite important since, if the workpiece should move during inspection, the inspection points will be skewed and the quality of the inspection compromised.

Of course, these light-duty workpiece hold-down clamps may also be used for other, non-inspection applications (e.g., light metal manufacturing processes and/or woodworking processes) where only light holding forces are required. By way of example but not limitation, these light-duty workpiece hold-down clamps may also be used during laser etching, parts marking, soldering, routing, etc., and/or for applying a light force to a wood part so as to help ensure accuracy during drilling, cutting, etc.

Unfortunately, existing light-duty workpiece hold-down clamps are not entirely satisfactory. More particularly, existing light-duty workpiece hold-down clamps all tend to suffer from one or more disadvantages, including but not limited to: (i) time-consuming set-up and take-down; (ii) restricted access to the workpiece; (iii) the need to use hand tools to assist in the removal or insertion of a workpiece; (iv) cost; (v) restricted methods of use; (vi) an inability to scale to different sizes; (vii) an inability to be used with standard fixture plates; (viii) a need to manufacture the workpiece hold-down clamps out of specific materials; and/or (ix) an inability to be used with workpieces of different sizes and/or configurations.

OBJECTS OF THE INVENTION

Accordingly, a primary object of the present invention is to provide a novel light-duty workpiece hold-down clamp which addresses some or all of the deficiencies of the prior art.

Another object of the present invention is to provide a new and improved workpiece hold-down clamp which comprises a clamp post which is intended to be mounted to the fixture plate, and a clamp finger which is adjustably mounted to the clamp post, wherein the distal end of the clamp finger engages the workpiece which is to be held to the fixture plate, and the clamp finger rides up and down the clamp post, allowing the height of the clamp finger to be adjusted according to the height of the workpiece.

Another object of the present invention is to provide a new and improved workpiece hold-down clamp which comprises a clamp post which is intended to be mounted to the fixture plate, and a clamp finger which is adjustably mounted to the clamp post, wherein the distal end of the clamp finger engages the workpiece which is to be held to the fixture plate, and further wherein the clamp finger is flexible so as to allow for quick and easy replacement of the workpieces which are to be inspected, thereby speeding up the inspection process.

Another object of the present invention is to provide a new and improved clamping device comprising a flexible finger which can be lowered down onto the workpiece so as to hold very thin workpieces to a fixture plate with ample force.

Another object of the present invention is to provide a new and improved clamp finger which can be moved up and down a clamp post by simply squeezing tabs located on the base of the finger which releases a gripping pressure applied to the clamp post. This construction allows the user to move the clamp finger up and down the clamp post with one hand while a workpiece is placed on the fixture plate with the other hand.

Another object of the present invention is to provide a new and improved workpiece hold-down clamp which comprises a clamp post which is intended to be mounted to the fixture plate, and a clamp finger which is adjustably mounted to the clamp post, wherein the clamp finger can be selectively turned laterally, away from the workpiece, and yet remain in position on the clamp post and not fall down to the work surface. This construction eliminates the need to re-mount the workpiece hold-down clamp to the fixture plate each time a workpiece is removed and replaced, thereby speeding up the inspection process.

Another object of the present invention is to provide a new and improved workpiece hold-down clamp comprising a clamp post which is intended to be mounted to the fixture plate, and a flexible clamp finger which is adjustably mounted to the clamp post, wherein the tip of the flexible clamp finger can be manually lifted and lowered relative to the fixture plate so as to allow a workpiece to be replaced without moving the clamp finger up and down on the clamp post and/or laterally away from the workpiece.

Another object of the present invention is to provide a new and improved workpiece hold-down clamp which holds a workpiece down from above.

Another object of the present invention is to provide a new and improved workpiece hold-down clamp which eliminates the need for hand tools, glue and/or tape to assist in the holding, removal and/or replacement of a workpiece which is to be inspected.

Another object of the present invention is to provide a new and improved workpiece hold-down clamp which utilizes a one-piece design, with a spring action, that is not only relatively simple to use, but also relatively inexpensive to manufacture, particularly when compared with the inspection work-holding devices currently available.

Another object of the present invention is to provide a new and improved workpiece hold-down clamp having a geometry which can be produced in substantially any size so as to enable the workpiece hold-down clamp to be used with workpieces having a wide range of different sizes and shapes.

Another object of the present invention is to provide a new and improved workpiece hold-down clamp which can be used with standard fixture plates and which can be incorporated into existing fixtures.

Another object of the present invention is to provide a new and improved workpiece hold-down clamp which can be manufactured in plastic, metal or other material, depending upon the application.

Another object of the present invention is to provide a new and improved workpiece hold-down clamp which can be used alone to secure one workpiece to a fixture plate, or which can be designed into a multi-piece fixture.

Another object of the present invention is to provide a new and improved workpiece hold-down clamp which comprises a clamp post which is intended to be mounted to the fixture plate, and a clamp finger which is adjustably mounted to the clamp post, wherein the clamp finger can be used with any length clamp post so as to accommodate the height of the workpiece which is to be held to the fixture plate.

Another object of the present invention is to provide a new and improved workpiece hold-down clamp which addresses the principles of "Lean manufacturing" by reducing the time it takes to carry out the non-value-added step of workpiece inspection.

Another object of the present invention is to provide a new and improved workpiece hold-down clamp which comprises a clamp post which is intended to be mounted to the fixture plate and a clamp finger which is adjustably mounted to the clamp post, wherein the clamp finger can be raised on the clamp post as easily as it can be lowered on the clamp post, whereby to enable the workpiece hold-down clamp to accommodate a wide range of different workpiece thicknesses.

Another object of the present invention is to provide a new and improved workpiece hold-down clamp which comprises a clamp post which is intended to be mounted to the fixture plate, and a clamp finger adjustably mounted to the clamp post, wherein the connection between the clamp finger and the clamp post comprises an aggressive gripping mechanism which can be easily relaxed when desired.

Another object of the present invention is to provide a new and improved workpiece hold-down clamp which comprises a clamp post which is intended to be mounted to the fixture plate, and a clamp finger adjustably mounted to the clamp post, wherein the connection between the clamp finger and the clamp post comprises a low profile construction.

Another object of the present invention is to provide a new and improved workpiece hold-down clamp which utilizes a spring action which allows for quick and easy replacement of a workpiece to be inspected, thereby speeding up the inspection process.

SUMMARY OF THE INVENTION

These and other objects of the present invention are addressed by the provision and use of a novel workpiece hold-down clamp for securing a workpiece to a fixture plate. The novel workpiece hold-down clamp generally comprises a clamp post which is intended to be secured to the fixture plate, and a clamp finger which is adapted to be adjustably mounted to the clamp post, with the free tip of the clamp finger being used to apply a downward force to the top surface of the workpiece so as to hold the workpiece down against the fixture plate. The shaft of the clamp post remains straight and is not stressed or bent under pressure when the clamp finger makes forceful contact with the workpiece. In one preferred form of the invention, one end of the clamp post is intended to be secured to the fixture plate by screwing the clamp post into a hole formed in the fixture plate. If desired, at least one, and preferably two or more, flats may be provided in the outer surface of the clamp post so as to provide a gripping surface which facilitates screwing the clamp shaft into the fixture plate.

In one preferred form of the invention, the clamp finger comprises a flexible cantilever beam which is secured to the clamp post by a mount which comprises a pair of opposing jaws which close down on the clamp post, wherein each of the jaws is provided with a tab, such that by pressing inboard on the tabs, the jaws grasping the clamp post are opened, whereby to allow movement of the clamp finger relative to the clamp post.

In one preferred form of the invention, there is provided a workpiece hold-down clamp for securing a workpiece to a fixture plate, the workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece;

wherein the clamp finger comprises a cantilever beam which is flexible.

In another preferred form of the invention, there is provided a workpiece hold-down clamp for securing a workpiece to a fixture plate, the workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece;

wherein the clamp finger comprises a cantilever beam which is connected to the clamp post by a mount, and further wherein the mount comprises a pair of opposing jaws which define a bore and a slot therebetween.

In another preferred form of the invention, there is provided a method for securing a workpiece to a fixture plate, the method comprising:

providing a workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece;

wherein the clamp finger comprises a cantilever beam which is flexible;

positioning a workpiece on the fixture plate; and engaging the workpiece with the clamp finger so as to secure the workpiece to the fixture plate.

In another preferred form of the invention, there is provided a method for securing a workpiece to a fixture plate, the method comprising:

providing a workpiece hold-down clamp for securing a workpiece to a fixture plate, the workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece;

wherein the clamp finger comprises a cantilever beam which is connected to the clamp post by a mount, and further wherein the mount comprises a pair of opposing jaws which define a bore and a slot therebetween;

positioning a workpiece on the fixture plate; and engaging the workpiece with the clamp finger so as to secure the workpiece to the fixture plate.

In another preferred form of the invention, there is provided a workpiece hold-down clamp for securing a workpiece to a fixture plate, the workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece.

In another preferred form of the invention, there is provided a method for securing a workpiece to a fixture plate, the method comprising:

providing a workpiece hold-down clamp comprising:

a clamp post for mounting to the fixture plate; and a clamp finger which is adjustably mounted to the clamp post, wherein the clamp finger is configured for selective movement along the clamp post, and wherein the clamp finger comprises a portion for engaging the workpiece;

positioning a workpiece on the fixture plate; and engaging the workpiece with the clamp finger so as to secure the workpiece to the fixture plate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

Figure 2:
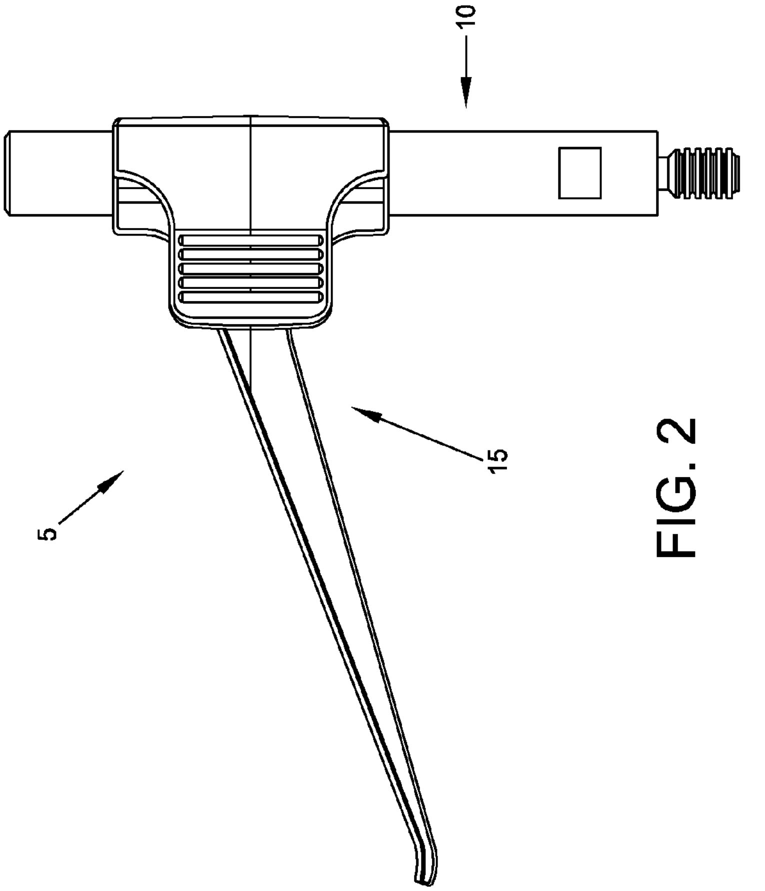
FIG. 2 is a schematic side view of the workpiece hold-down clamp of FIG. 1.
Figure 1:
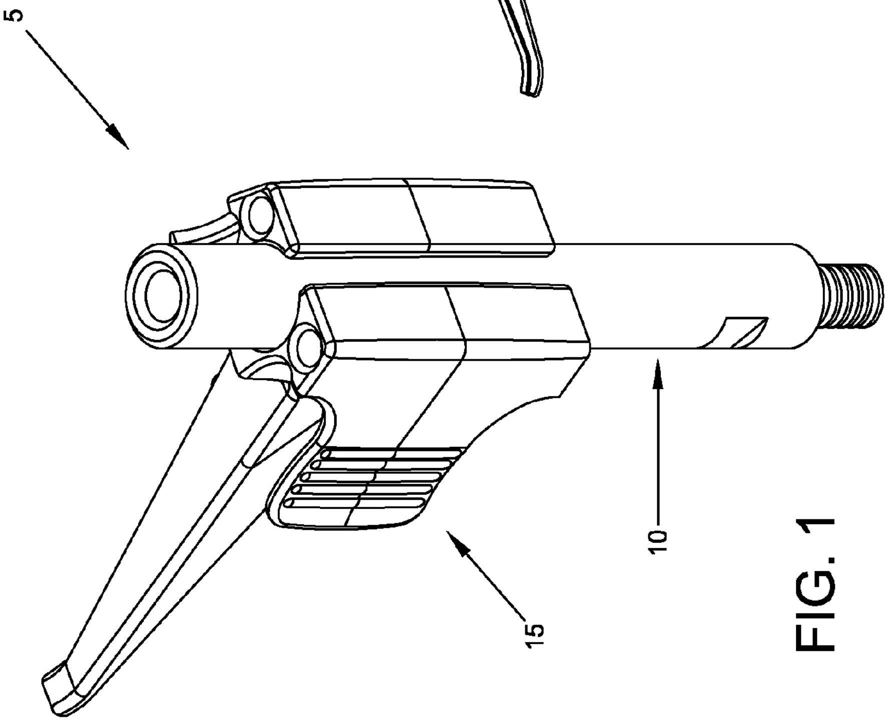
FIG. 1 is a schematic perspective view showing a novel workpiece hold-down clamp formed in accordance with the present invention, wherein the workpiece hold-down clamp comprises a clamp post which is intended to be mounted to the fixture plate, and a clamp finger which is adjustably mounted to the clamp post.
Figure 4:
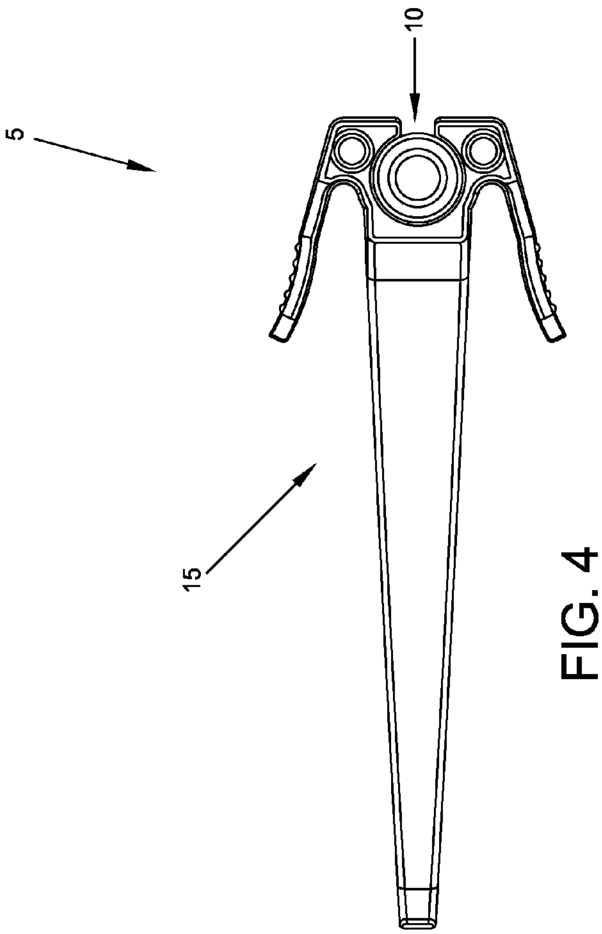
FIG. 4 is a schematic top view of the workpiece hold-down clamp of FIG. 1.
Figure 3:
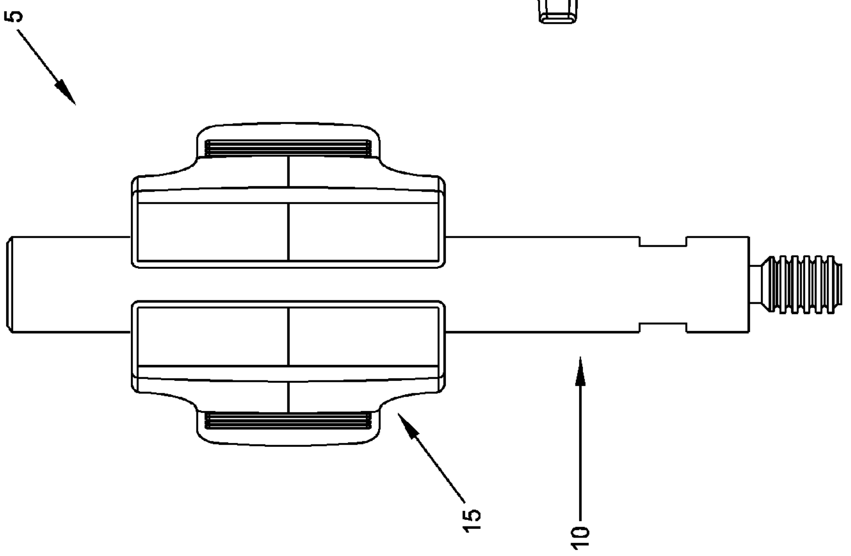
FIG. 3 is a schematic rear view of the workpiece hold-down clamp of FIG. 1.
Figure 6:
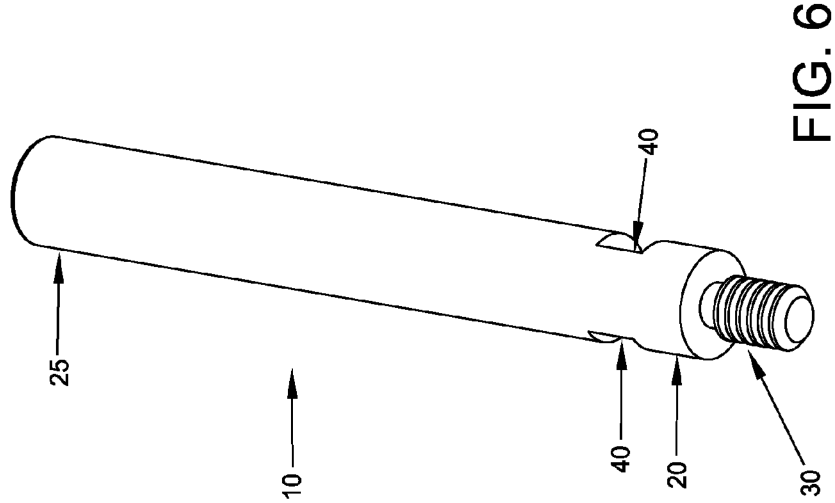
FIG. 6 is a schematic perspective view of the clamp post of the workpiece hold-down clamp of FIG. 1.
Figure 5:
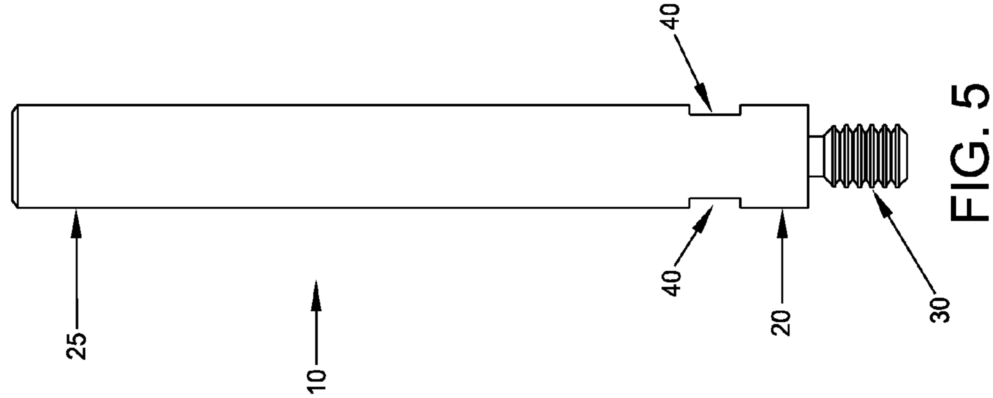
FIG. 5 is a schematic side view of the clamp post of the workpiece hold-down clamp of FIG. 1.
Figure 7:
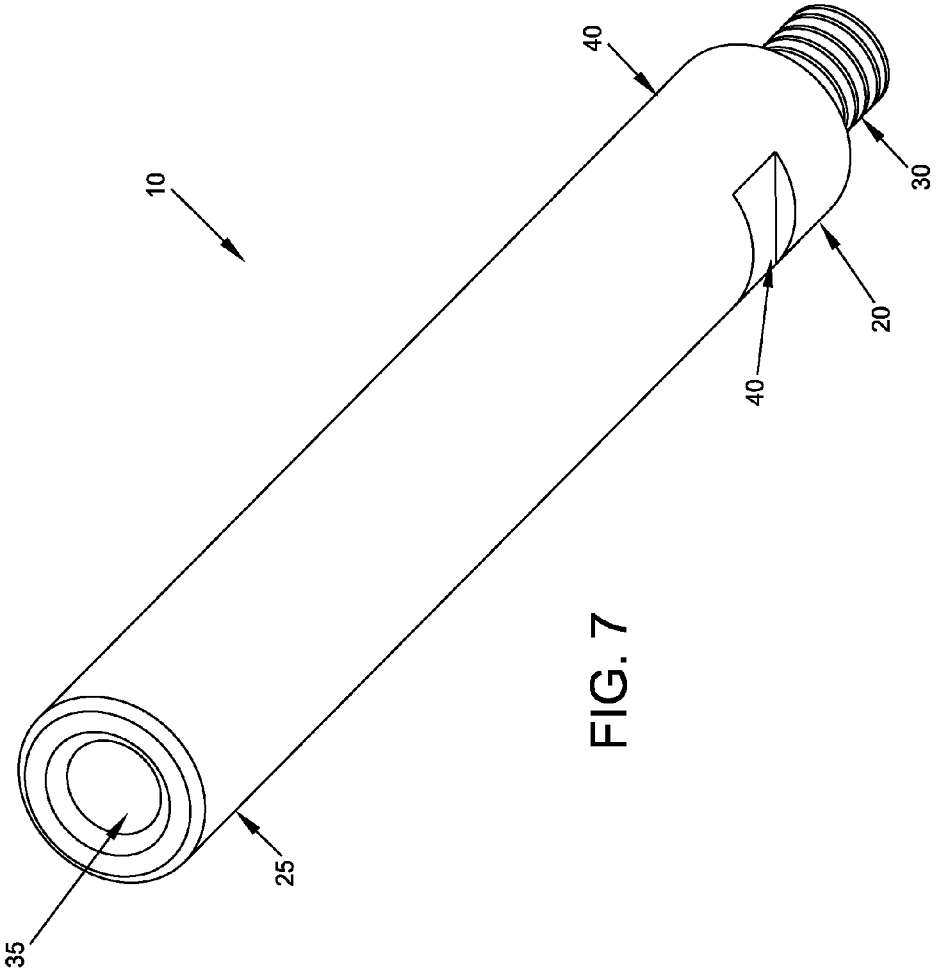
FIG. 7 is another schematic perspective view of the clamp post of the workpiece hold-down clamp of FIG. 1.
Figure 8:
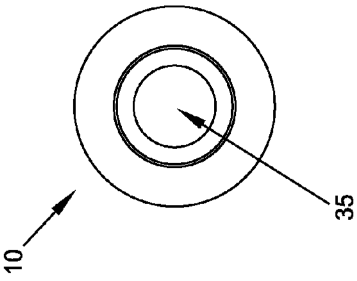
FIG. 8 is a schematic top view of the clamp post of the workpiece hold-down clamp of FIG. 1.

Looking first at FIGS. 1-4, there is shown a novel workpiece hold-down clamp 5 for securing a workpiece to a fixture plate. Workpiece hold-down clamp 5 generally comprises a clamp post 10 and a clamp finger 15.

Clamp post 10 is shown in greater detail in FIGS. 5-8. Clamp post 10 generally comprises a substantially rigid, generally cylindrical structure have a distal end 20 and a proximal end 25. Distal end 20 preferably comprises a distal projection 30 which is threaded, such that clamp post 10 can be secured to a fixture plate by screwing threaded distal projection 30 into a threaded hole provided in the fixture plate, as will hereinafter be discussed in further detail. Proximal end 25 preferably comprises a proximal recess 35. Recess 35 is preferably threaded, so that the threaded distal projection 30 of one clamp post can be received into the threaded proximal recess 35 of another clamp post, such that two or more clamp posts can be serially connected together so as to form a composite assembly of extended length. Clamp post 10 preferably also comprises at least one, and preferably a pair, of diametrically-opposed flats 40. Flats 40 permit clamp post 10 to be easily turned by a tool, e.g., in order to mount clamp post 10 to a fixture plate as will hereinafter be discussed, or to mount clamp post 10 to the proximal end of another clamp post, etc. Clamp post 10 may be formed out of any suitable material having the requisite strength and rigidity, e.g., a metal such as stainless steel.

Clamp finger 15 is shown in greater detail in FIGS. 9-12. Clamp finger 15 generally comprises a cantilever beam 45 having a distal end 50 and a proximal end 55. The distal end of cantilever beam 45 terminates in a distal tip 60 for engaging a workpiece and the proximal end of cantilever beam 45 terminates in a mount 65 for adjustably mounting clamp finger 15 to a clamp post 10. Cantilever beam 45 is preferably somewhat flexible along its length.

Mount 65 comprises a pair of opposing jaws 70 which define a bore 75 and a slot 80 therebetween. A tab 85 extends from each of the jaws 70. Mount 65 is constructed so that when tabs 85 are forced towards each other (e.g., by compressing tabs 85 with the thumb and forefinger of a user), jaws 70 will flex on hinge points 90 and open away from each other, whereby to increase the effective diameter of bore 75 and the effective width of slot 80. Correspondingly, when tabs 85 are released, jaws 70 once again flex on hinge points 90 and close back towards each other so as to restore bore 75 and slot 80 to their normal, relaxed dimensions. Thus, hinge points 90 effectively act as living hinges for jaws 70. In other words, jaws 70 are effectively connected to proximal end 55 of cantilever beam 45 by spring arms. Bore 75 is sized so that it is normally somewhat smaller than the diameter of clamp post 10, such that tabs 85 must be used to open jaws 70 so that clamp post 10 may be received in bore 75. Correspondingly, when tabs 85 are released, jaws 70 will close down around clamp post 10 in a "bear hug" fashion and securely grip clamp post 10 within bore 75, thereby securely mounting clamp finger 15 to clamp post 10.

Figure 10:
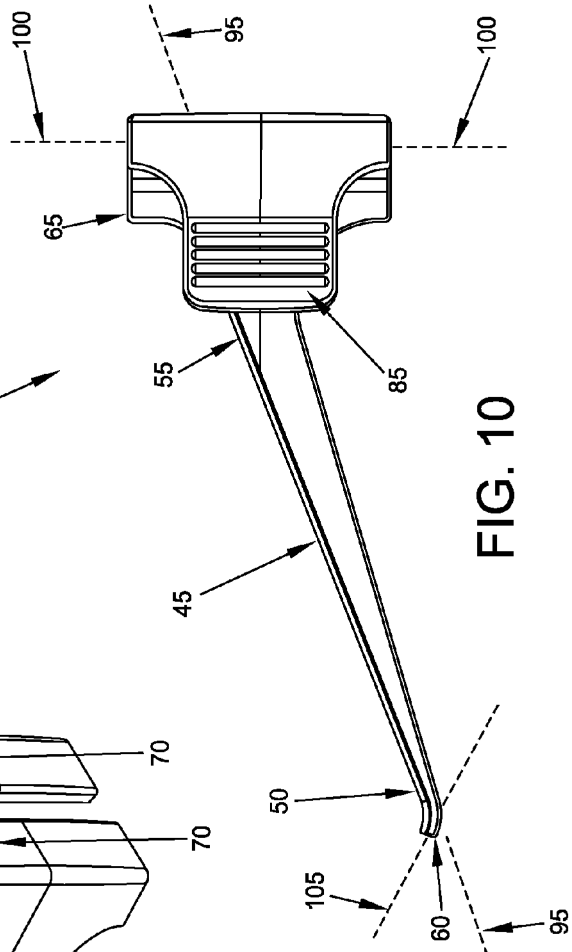
FIG. 10 is a schematic side view of the clamp finger of the workpiece hold-down clamp of FIG. 1.
Figure 9:
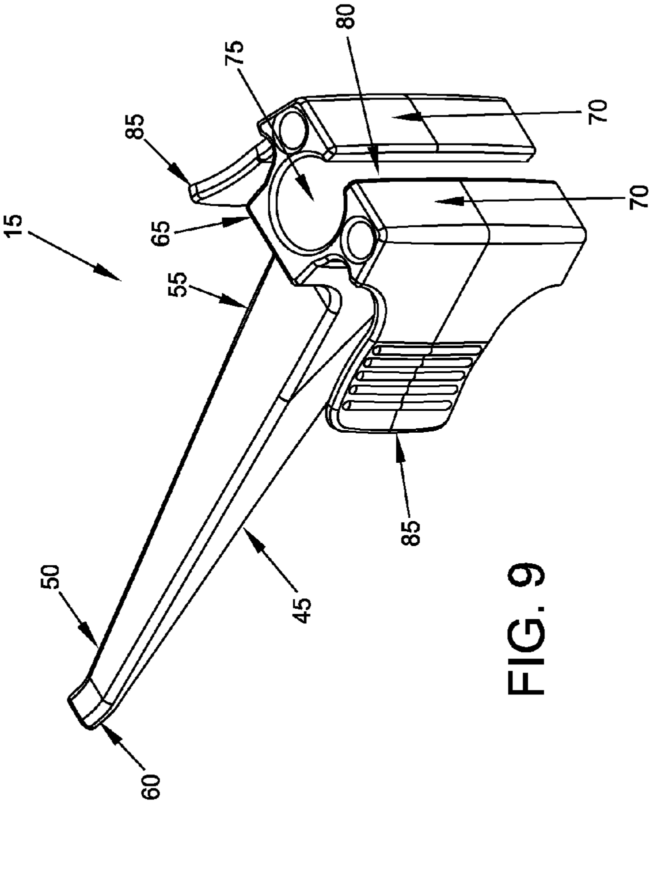
FIG. 9 is a schematic perspective view of the clamp finger of the workpiece hold-down clamp of FIG. 1.
Figure 12:
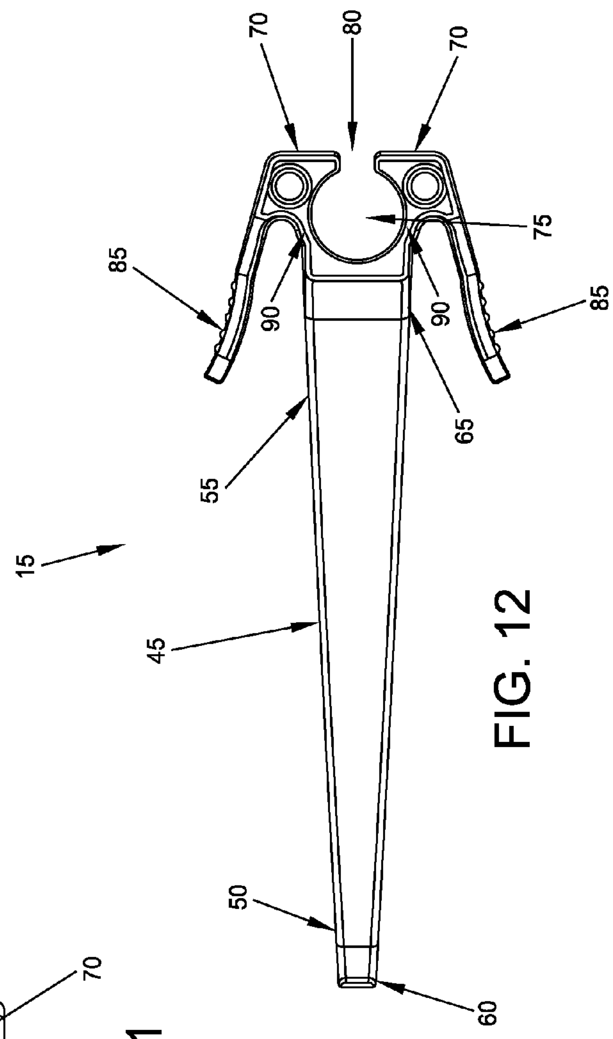
FIG. 12 is a schematic top view of the clamp finger of the workpiece hold-down clamp of FIG. 1.
Figure 11:
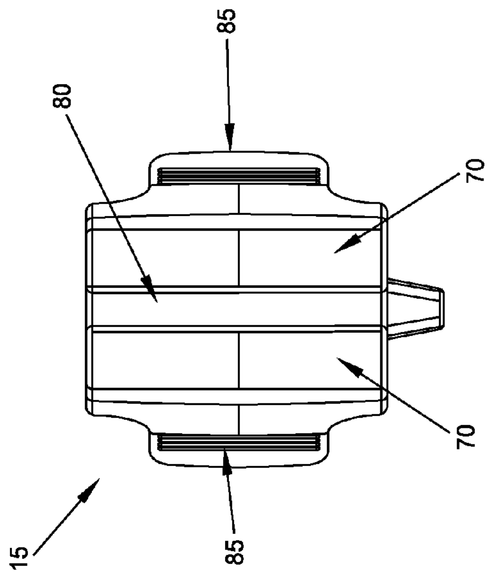
FIG. 11 is a schematic rear view of the clamp finger of the workpiece hold-down clamp of FIG. 1.
Figure 13:
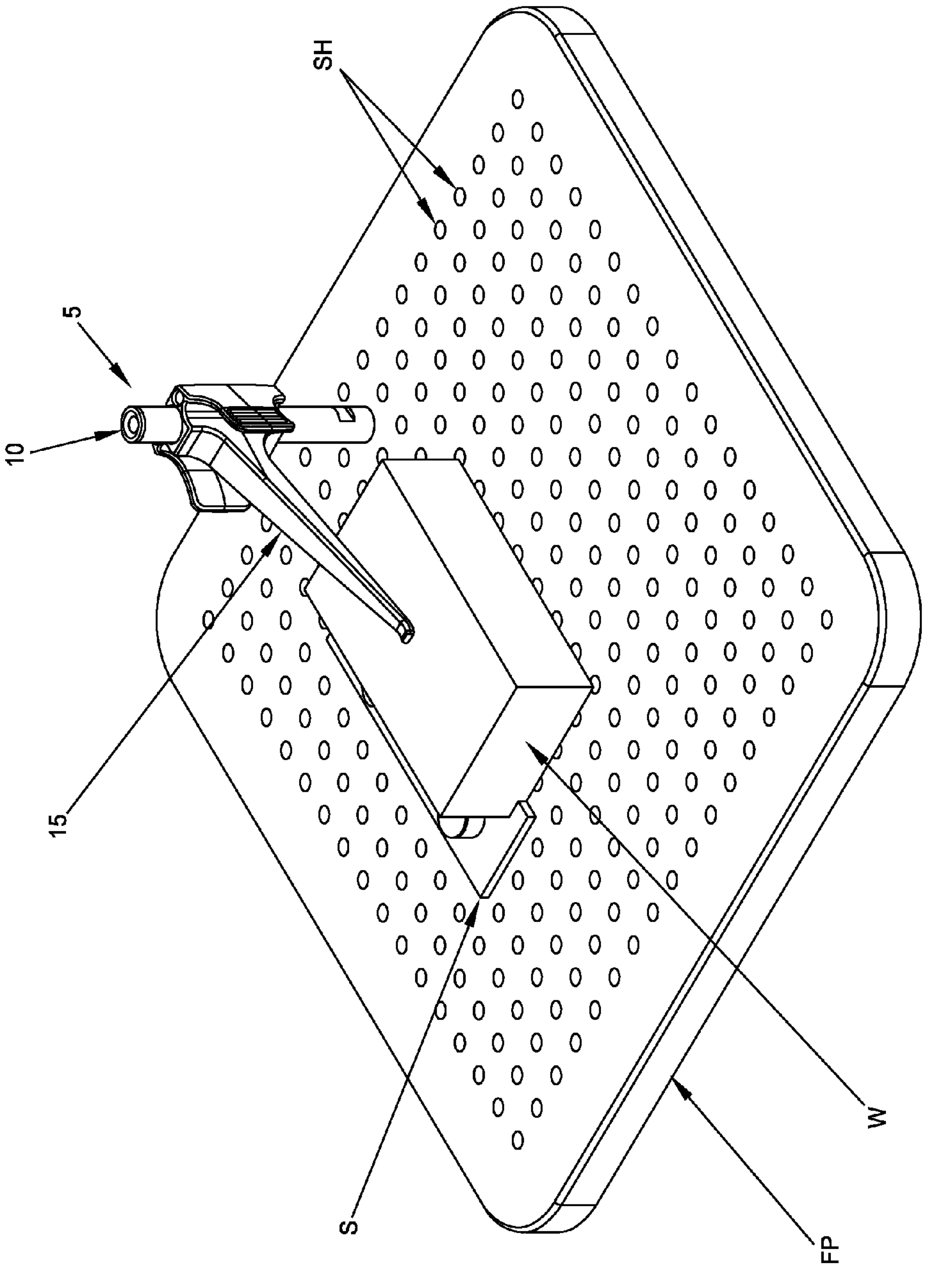
FIG. 13 is a schematic perspective view showing the workpiece hold-down clamp of FIG. 1 securing a workpiece to a fixture plate.
Figure 14:
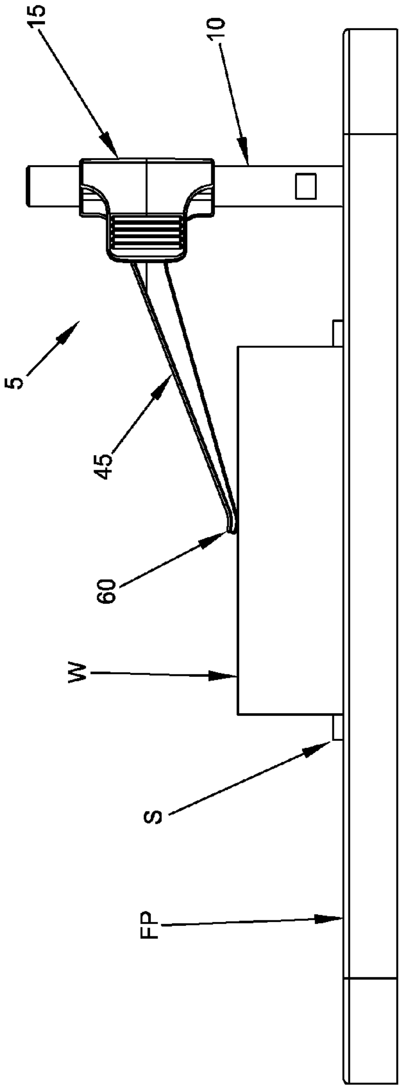
FIG. 14 is a schematic side view showing the workpiece hold-down clamp of FIG. 1 securing a workpiece to a fixture plate.
Figure 15:
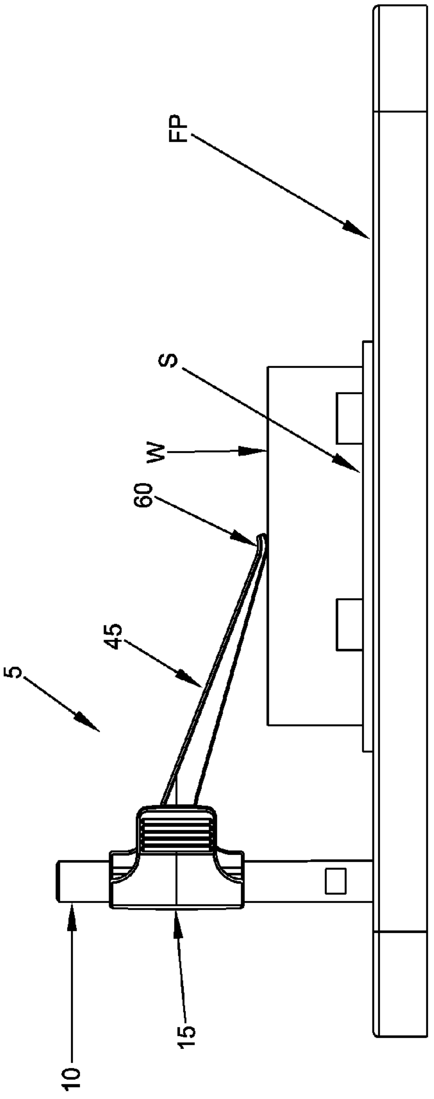
FIG. 15 is another schematic side view showing the workpiece hold-down clamp of FIG. 1 securing a workpiece to a fixture plate.
Figure 16:
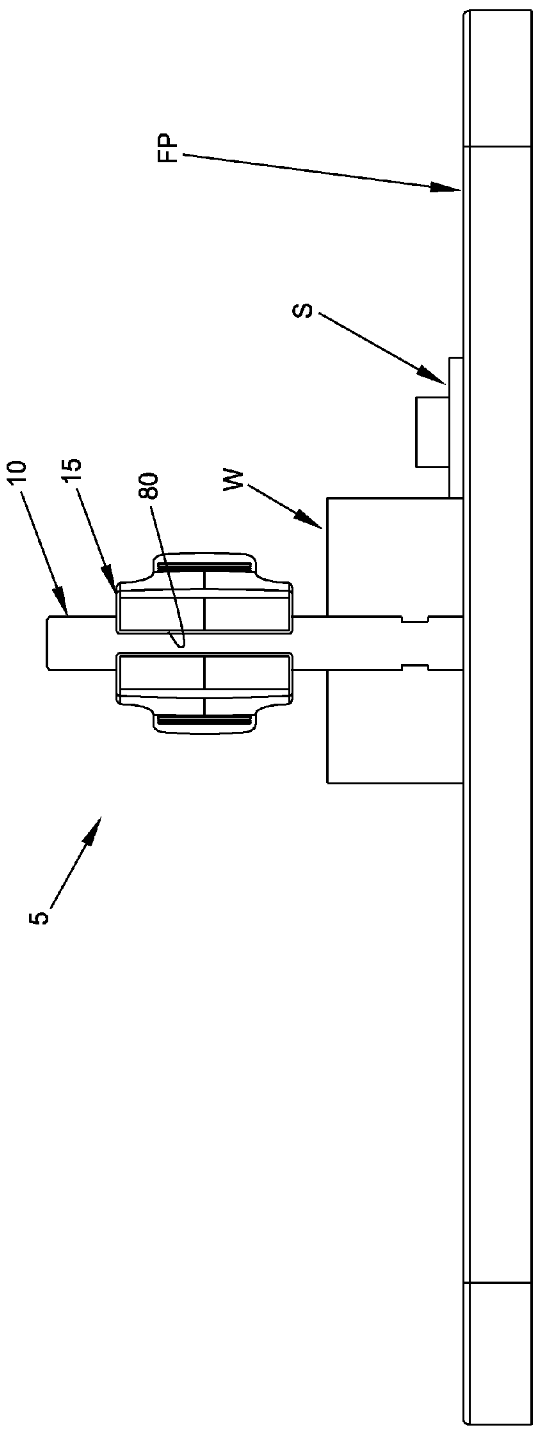
FIG. 16 is a schematic rear view showing the workpiece hold-down clamp of FIG. 1 securing a workpiece to a fixture plate.
Figure 17:
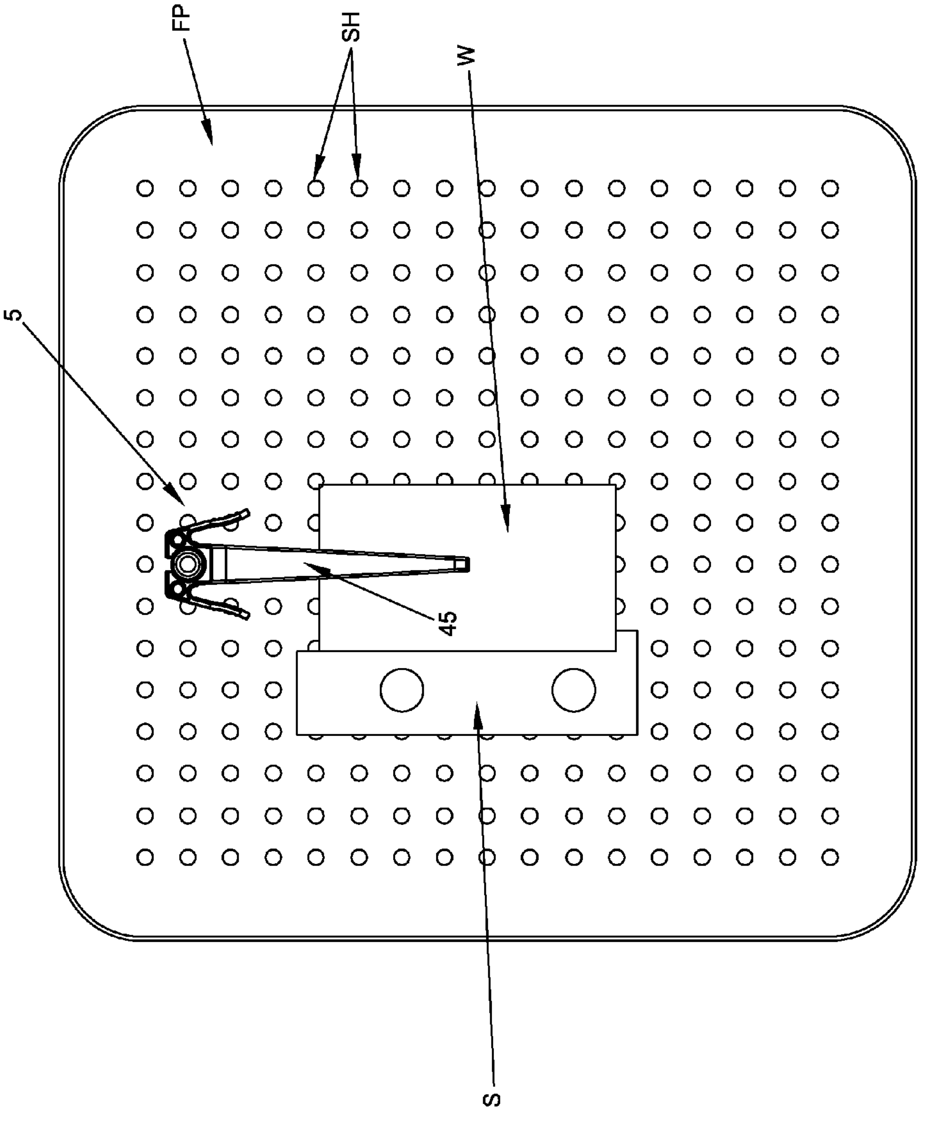
FIG. 17 is a schematic top view showing the workpiece hold-down clamp of FIG. 1 securing a workpiece to a fixture plate.
Figure 18:
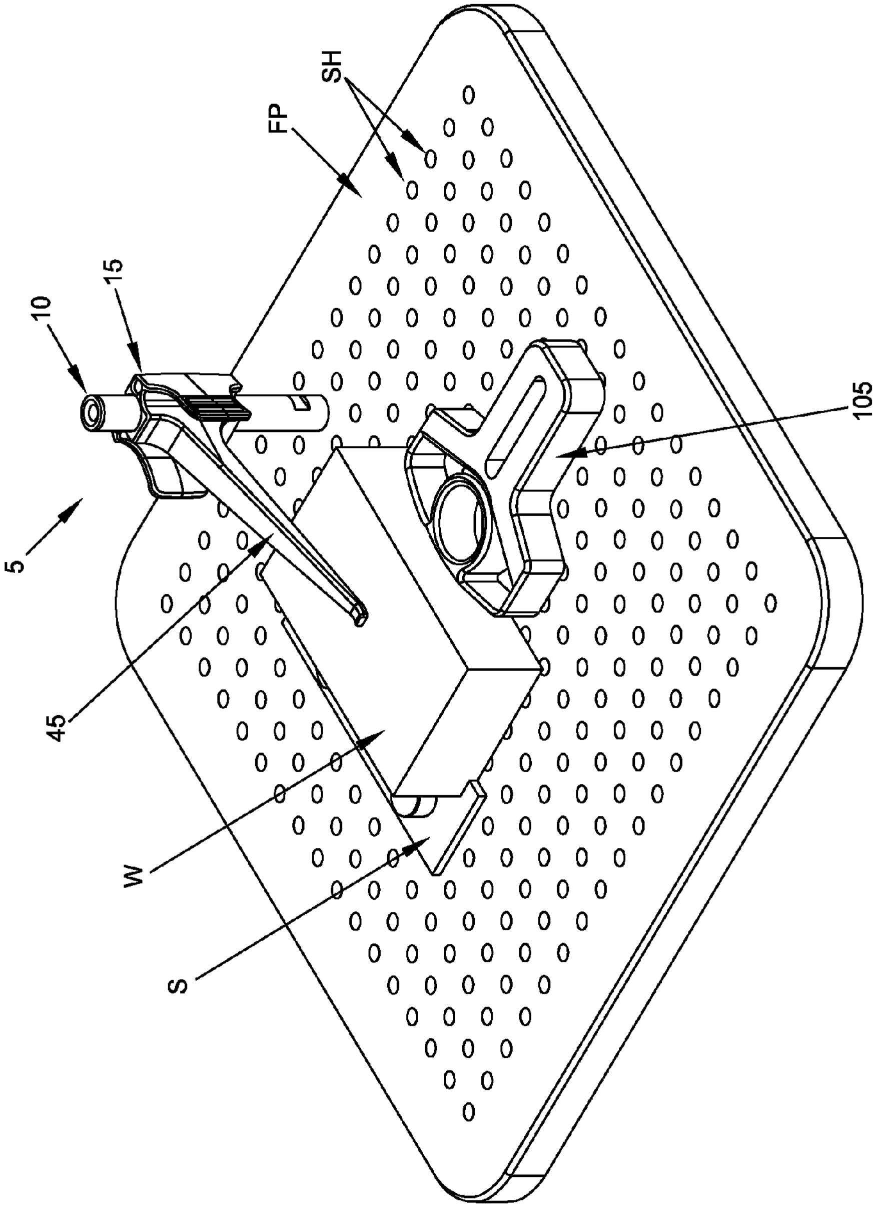
FIG. 18 is a schematic side view showing the workpiece hold-down clamp of FIG. 1 working in conjunction with another workpiece clamp to secure a workpiece to a fixture plate.
Figure 19:
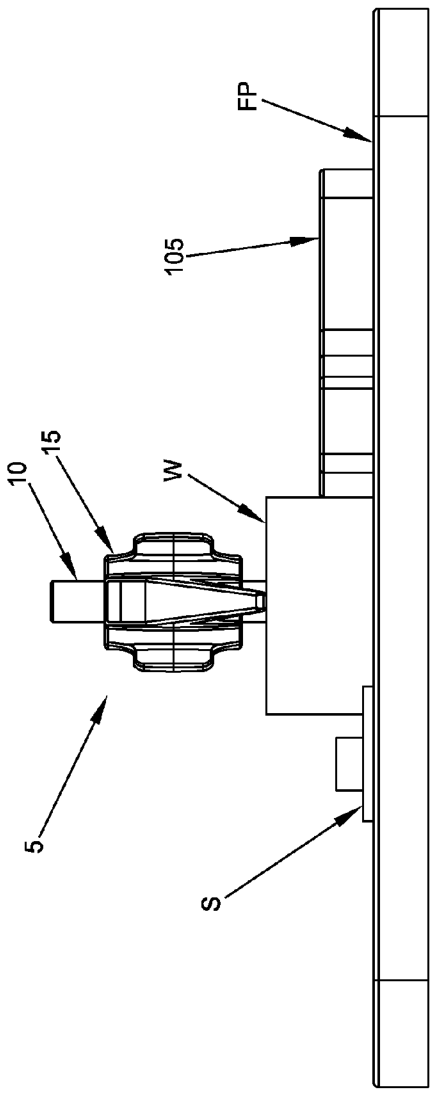
FIG. 19 is a schematic front view showing the workpiece hold-down clamp of FIG. 1 working in conjunction with another workpiece clamp to secure a workpiece to a fixture plate.
Figure 20:
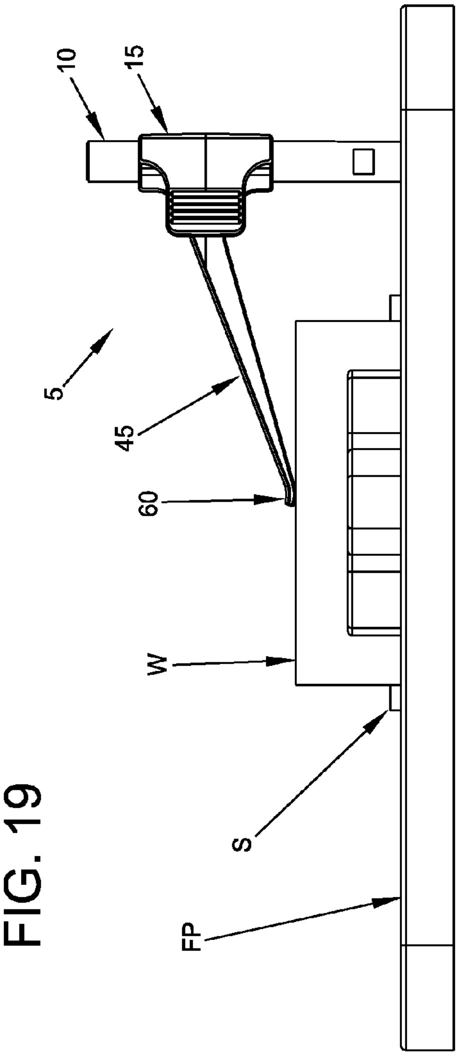
FIG. 20 is a schematic side view showing the workpiece hold-down clamp of FIG. 1 working in conjunction with another workpiece clamp to secure a workpiece to a fixture plate.
Figure 21:
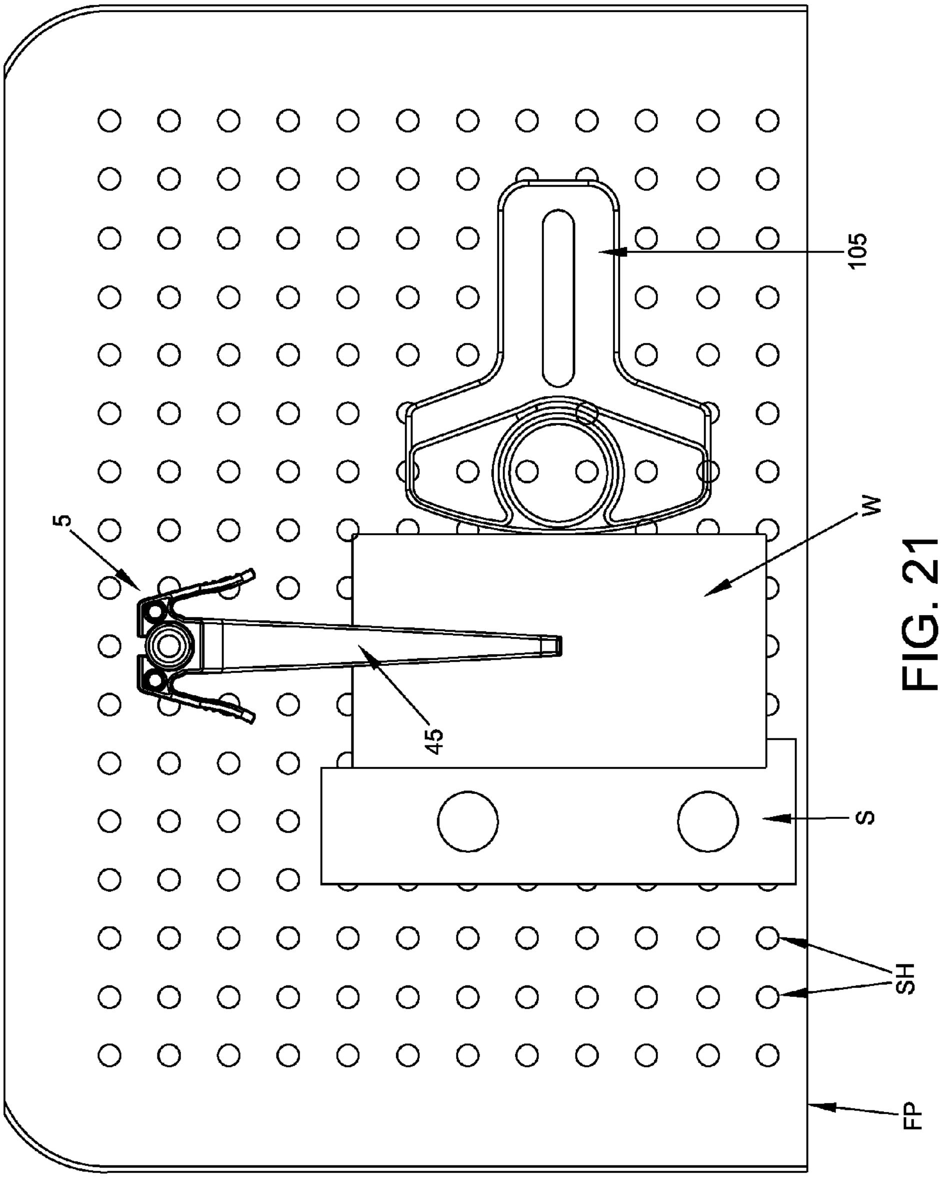
FIG. 21 is a schematic top view showing the workpiece hold-down clamp of FIG. 1 working in conjunction with another workpiece clamp to secure a workpiece to a fixture plate.

In one preferred form of the invention, cantilever beam 45 is substantially linear, extending along a longitudinal axis 95 (FIG. 10). And in one preferred form of the invention, cantilever beam 45 extends at an acute angle to the longitudinal axis of bore 75 (i.e., longitudinal axis 95 of cantilever beam 45 extends at an acute angle to longitudinal axis 100 of bore 75), so that clamp finger 15 extends downwardly and away from clamp post 10, in the manner shown in FIG. 2. And in one preferred form of the invention, distal tip 60 of cantilever beam 45 is substantially linear, extending along a longitudinal axis 105, with longitudinal axis 105 extending at an acute angle to the longitudinal axis 95 of cantilever beam 45, such that distal tip 60 will lie flat against, or rise slightly upward from, a workpiece being held down by clamp finger 15, as will hereinafter be discussed.

In one preferred form of the invention, proximal end 55 of cantilever beam 45 joins jaws 70 substantially intermediate their height, or even somewhere along the upper half of jaws 70, so that jaws 70 protrude only a relatively short distance above proximal end 55 of cantilever beam 45, whereby to provide a relatively low profile mount while still providing adequate "holding power" for the mount.

Preferably clamp finger 15 is formed as a single, integral part fabricated from an appropriately strong yet resilient material, e.g. as a molded piece of plastic, a machined metal part, etc. In this respect it will be appreciated that while certain portions of workpiece hold-down clamp 5 (e.g., hinge points 90 and cantilever beam 45) should be resilient, the workpiece hold-down clamp must also have sufficient structural integrity to perform its desired function. This can be achieved through the selection of an appropriate construction material and by the appropriate dimensioning of the elements, as will be apparent to those skilled in the art in view of the present disclosure.

Workpiece hold-down clamp 5 may be used to secure a workpiece to a fixture plate. By way of example but not limitation, and looking now at FIGS. 13-17, a workpiece W may be placed on the top surface of a fixture plate FP. Fixture plate FP includes a plurality of screw holes SH. Preferably these screw holes SH are formed in the fixture plate FP with a regular pattern, and regular spacing, in order to facilitate utilization of the present invention with substantially any desired set-up configuration. The workpiece W is placed in position on the fixture plate FP (e.g., against a stop S which is located on the fixture plate FP), and then workpiece hold-down clamp 5 is used to clamp workpiece W to the fixture plate.

In one preferred mode of operation, (i) workpiece W is first placed on the fixture plate FP (e.g., against stop S); (ii) clamp post 10 of workpiece hold-down clamp 5 is fastened to fixture plate FP (e.g., by screwing threaded distal projection 30 of clamp post 10 into a screw hole SH of fixture plate FP); (iii) clamp finger 15 is mounted on clamp post 10 and moved down along clamp post 10 until distal tip 60 of cantilever beam 45 comes into engagement with, and applies sufficient force to, workpiece W (e.g., by pressing inwardly on tabs 85 so as to open jaws 70 to slidingly received clamp post 10 in bore 75); (iv) finger clamp 15 is clamped in place on clamp post 10 (e.g., by releasing tabs 85 so as to cause jaws 70 to clamp down on clamp post 10), whereby to secure the clamp finger 15 in position relative to fixture plate FP, with the distal tip 60 of cantilever beam 45 engaging workpiece W and holding it securely against fixture plate FP.

Significantly, if it is thereafter desired to inspect another workpiece W, the just-inspected workpiece W may be removed from fixture plate FP by simply (i) lifting distal tip 60 of cantilever beam 45 upward, away from workpiece W; (ii) the just-inspected workpiece W is removed from fixture plate FP; (iii) a new workpiece W is positioned on the fixture plate FP; and (iv) then the lifting force being applied to cantilever beam 45 of clamp finger 10 is released so that the distal tip 60 of cantilever beam 45 engages the new workpiece W and holds it securely in place against fixture plate FP. Significantly, the user can carry out the foregoing by using one hand to lift cantilever beam 45 of clamp finger 10 off the workpiece and using the other hand to switch out the just-inspected workpiece and switch in the next workpiece which is to be inspected.

Alternatively, the workpiece can be removed from beneath workpiece hold-down clamp 5 by simply pulling the workpiece out from beneath the clamp. In this respect it will be appreciated that the resilient nature of cantilever beam 45 will facilitate such a workpiece-removal action.

If desired, and as noted above, workpiece hold-down clamp 5 may be used alone or in combination with one or more stops S to hold a workpiece to a fixture plate. Furthermore, workpiece hold-down clamp 5 may be used in conjunction with other workpiece clamps. By way of example but not limitation, workpiece hold-down clamp 5 may be used with one or more of the workpiece clamps disclosed in co-pending U.S. patent application Ser. No. 13/020,390, filed Feb. 3, 2011 by Steven E. Phillips for METHOD AND APPARATUS FOR SECURING A WORKPIECE TO A FIXTURE PLATE USING AN ADJUSTABLE, LOW-PROFILE, LIGHT-DUTY WORKPIECE CLAMP, which patent application is hereby incorporated herein by reference. See, for example, FIGS. 18-21, which show a workpiece hold-down clamp 5 being used in conjunction with a stop S and a workpiece clamp 105 to hold a workpiece W to fixture plate FP.

Figure 22:
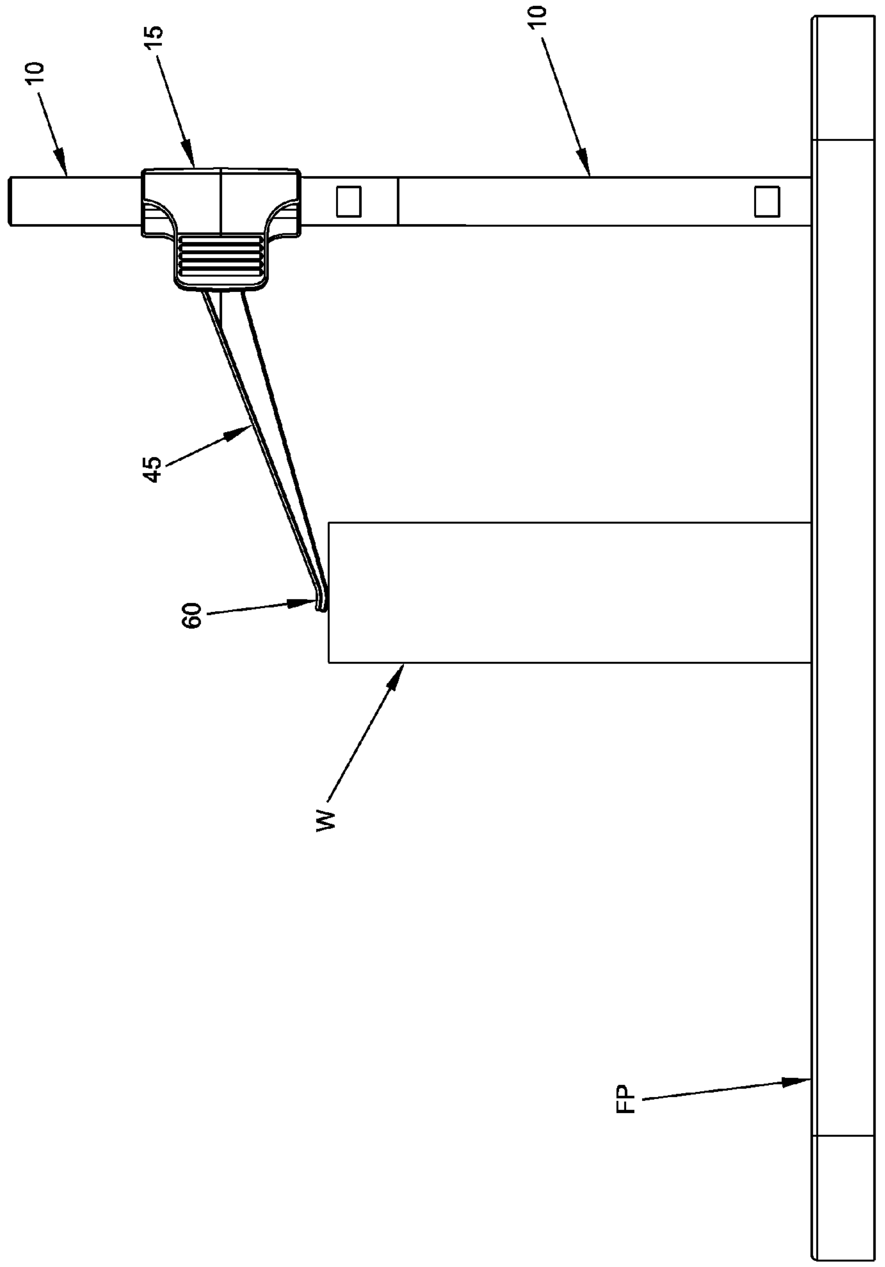
FIG. 22 is a schematic side view showing the workpiece hold-down clamp of FIG. 1 securing a workpiece to a fixture plate, wherein two clamp posts, stacked vertically, have been used to connect the clamp finger to the fixture plate.

As noted above, it is also possible to stack two or more of the clamp posts 10, one on top of another, so as to form the equivalent of a single elongated clamp post. See, for example, FIG. 22, where two clamp posts 10 have been stacked one on top of another so as to form a composite assembly of extended length. This construction can be highly advantageous where the workpiece hold-down clamp must be used with a relatively tall workpiece and only shorter clamps are available (e.g., for inventory reasons).

If desired, workpiece hold-down clamp 5 may be assembled so that clamp finger 15 is mounted "upside down" on clamp post 10, with cantilever beam 45 extending upwardly relative to the clamp post, i.e., with distal tip 60 of cantilever beam 45 oriented toward proximal end 25 of clamp post 10 rather than toward distal end 20 of clamp post 10 (as shown in FIG. 2). With this construction, distal tip 60 of clamp finger 15 can hook "over" the top surface of the workpiece so as to pull the workpiece down against the fixture plate, rather than push down against the top surface of the workpiece as is the case with the construction shown in FIG. 2. This approach can be very useful in the case of relatively tall workpieces. Furthermore, with this alternative manner of assembly, the workpiece hold-down clamp can also be used "upside down", i.e., so as to apply an upward holding force to a workpiece. This approach can be very useful where it can be helpful to apply an upward force to the workpiece.

Also, if desired, cantilever beam 45 may be oriented at a different angle to clamp post 10, e.g., cantilever beam 45 may be oriented at a substantially right angle to clamp post 10 rather than at an acute angle to clamp post 10 (as shown in FIG. 2), or cantilever beam 45 may be oriented at an acute but upward angle to the clamp post 10.

Furthermore, various tips may be added to the distal end of cantilever beam 45 (e.g., a relatively soft, atruamatic tip to avoid marring a workpiece), and/or the distal end of clamp post 10 could accept various inserts, e.g., so as to change the size of threaded distal projection 30.

It is also possible to form cantilever beam 45 as a substantially rigid structure if desired.

Numerous advantages are achieved by the provision and use of the novel workpiece clamp of the present invention.

For one thing, the present invention provides a novel workpiece hold-down clamp which addresses some or all of the deficiencies of the prior art.

And the present invention provides a new and improved workpiece hold-down clamp which comprises a clamp post which is intended to be mounted to the fixture plate, and a clamp finger which is adjustably mounted to the clamp post, wherein the distal end of the clamp finger engages the workpiece which is to be held to the fixture plate, and the clamp finger rides up and down the clamp post, allowing the height of the clamp finger to be adjusted according to the height of the workpiece.

And the present invention provides a new and improved workpiece hold-down clamp which comprises a clamp post which is intended to be mounted to the fixture plate, and a clamp finger which is adjustably mounted to the clamp post, wherein the distal end of the clamp finger engages the workpiece which is to be held to the fixture plate, and further wherein the clamp finger is flexible so as to allow for quick and easy replacement of the workpieces which are to be inspected, thereby speeding up the inspection process.

And the present invention provides a new and improved clamping device comprising a flexible finger which can be lowered down onto the workpiece so as to hold very thin workpieces to a fixture plate with ample force.

And the present invention provides a new and improved clamp finger which can be moved up and down a clamp post by simply squeezing tabs located on the base of the finger which releases a gripping pressure applied to the clamp post. This construction allows the user to move the clamp finger up and down the clamp post with one hand while a workpiece is placed on the fixture plate with the other hand.

And the present invention provides a new and improved workpiece hold-down clamp which comprises a clamp post which is intended to be mounted to the fixture plate, and a clamp finger which is adjustably mounted to the clamp post, wherein the clamp finger can be selectively turned laterally, away from the workpiece, and yet remain in position on the clamp post and not fall down to the work surface. This construction eliminates the need to re-mount the workpiece hold-down clamp to the fixture plate each time a workpiece is removed and replaced, thereby speeding up the inspection process.

And the present invention provides a new and improved workpiece hold-down clamp comprising a clamp post which is intended to be mounted to the fixture plate, and a flexible clamp finger which is adjustably mounted to the clamp post, wherein the tip of the flexible clamp finger can be manually lifted and lowered relative to the fixture plate so as to allow a workpiece to be replaced without moving the clamp finger up and down on the clamp post and/or laterally away from the workpiece.

And the present invention provides a new and improved workpiece hold-down clamp which holds a workpiece down from above.

And the present invention provides a new and improved workpiece hold-down clamp which eliminates the need for hand tools, glue and/or tape to assist in the holding, removal and/or replacement of a workpiece which is to be inspected.

And the present invention provides a new and improved workpiece hold-down clamp which utilizes a one-piece design, with a spring action, that is not only relatively simple to use, but also relatively inexpensive to manufacture, particularly when compared with the inspection work-holding devices currently available.

And the present invention provides a new and improved workpiece hold-down clamp having a geometry which can be produced in substantially any size so as to enable the workpiece hold-down clamp to be used with workpieces having a wide range of different sizes and shapes.

And the present invention provides a new and improved workpiece hold-down clamp which can be used with standard fixture plates and which can be incorporated into existing fixtures.

And the present invention provides a new and improved workpiece hold-down clamp which can be manufactured in plastic, metal or other material, depending upon the application. Plastic is a good choice as a non-marring material and, if molded, the parts can be produced inexpensively in many sizes and colors.

And the present invention provides a new and improved workpiece hold-down clamp which can be used alone to secure one workpiece to a fixture plate, or which can be designed into a multi-piece fixture.

And the present invention provides a new and improved workpiece hold-down clamp which comprises a clamp post which is intended to be mounted to the fixture plate, and a clamp finger which is adjustably mounted to the clamp post, wherein the clamp finger can be used with any length clamp post so as to accommodate the height of the workpiece which is to be held to the fixture plate.

And the present invention provides a new and improved workpiece hold-down clamp which addresses the principles of "Lean manufacturing" by reducing the time it takes to carry out the non-value-added step of workpiece inspection.

And the present invention provides a new and improved workpiece hold-down clamp which comprises a clamp post which is intended to be mounted to the fixture plate and a clamp finger which is adjustably mounted to the clamp post, wherein the clamp finger can be raised on the clamp post as easily as it can be lowered on the clamp post, whereby to enable the workpiece hold-down clamp to accommodate a wide range of different workpiece thicknesses.

And the present invention provides a new and improved workpiece hold-down clamp which comprises a clamp post which is intended to be mounted to the fixture plate, and a clamp finger adjustably mounted to the clamp post, wherein the connection between the clamp finger and the clamp post comprises an aggressive gripping mechanism which can be easily relaxed when desired.

And the present invention provides a new and improved workpiece hold-down clamp which comprises a clamp post which is intended to be mounted to the fixture plate, and a clamp finger adjustably mounted to the clamp post, wherein the connection between the clamp finger and the clamp post comprises a low profile construction.

And the present invention provides a new and improved workpiece hold-down clamp which utilizes a spring action that allows for quick and easy replacement of a workpiece to be inspected, thereby speeding up the inspection process.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A workpiece hold-down clamp for securing a workpiece to a fixture plate, the workpiece hold-down clamp comprising: a clamp post for mounting to the fixture plate, the clamp post having a proximal end, a distal end and a longitudinal axis extending therebetween; and a clamp finger which is adjustably mounted to the clamp post, wherein the clamp finger is configured for selective movement along the clamp post, and wherein the clamp finger comprises a portion for engaging the workpiece; wherein the clamp finger comprises a cantilever beam having a proximal end, a distal end and a longitudinal axis extending therebetween, wherein the proximal end of the cantilever beam is connected to the clamp post by a mount;

wherein the mount comprises a pair of opposing jaws which define a bore and a slot therebetween, wherein a tab is mounted to each of the opposing jaws;

wherein when the mount is connected to the clamp post, the tabs and the cantilever beam extend away from the clamp post in one direction and the slot opens on the clamp post in an opposite direction, and the longitudinal axis of the cantilever beam extends at an acute angle to the longitudinal axis of the clamp post so that the distal end of the cantilever beam is disposed lower than the proximal end of the cantilever beam.

2. The workpiece hold-down clamp according to claim 1 wherein the pair of opposing jaws are connected by a spring hinge.

3. The workpiece hold-down clamp according to claim 2 wherein the tab enables the user to move the pair of opposing jaws on its spring hinge.

4. The workpiece hold-down clamp according to claim 3 wherein squeezing the tabs together causes the pair of opposing jaws to open.

5. The workpiece hold-down clamp according to claim 4 wherein the diameter of the bore is smaller than the diameter of the clamp post when the tabs are not being squeezed.

6. The workpiece hold-down clamp according to claim 1 wherein the distal end of the clamp post is configured to be releasably mounted to the fixture plate.

7. The workpiece hold-down clamp according to claim 6 wherein the fixture plate comprises at least one screw hole, and further wherein the distal end of the clamp post is threaded for selective disposition in the at least one screw hole.

8. The workpiece hold-down clamp according to claim 1 wherein the proximal end of the clamp pot comprises a threaded hole for selectively receiving the threaded distal end of another clamp post.

9. The workpiece hold-down clamp according to claim 1 wherein the cantilever beam is flexible.

10. The workpiece hold-down clamp according to claim 9 wherein the cantilever beam has a flexibility such that it can be manually flexed by the fingers of a user.

11. A method for securing a workpiece to a fixture plate, the method comprising: providing a workpiece hold-down clamp for securing a workpiece to a fixture plate, the workpiece hold-down clamp comprising:

a clamp post for mounting to the fixture plate, the clamp post having a proximal end, a distal end and a longitudinal axis extending therebetween; and a clamp finger which is adjustably mounted to the clamp post, wherein the clamp finger is configured for selective movement along the clamp post, and wherein the clamp finger comprises a portion for engaging the workpiece; wherein the clamp finger comprises a cantilever beam having a proximal end, a distal end and a longitudinal axis extending therebetween, wherein the proximal end of the cantilever beam is connected, to the clamp post by a mount;

wherein the mount comprises a pair of opposing jaws which define a bore and a slot therebetween, wherein a tab is mounted to each of the opposing jaws;

wherein when the mount is connected to the clamp post, the tabs and the cantilever beam extend away from the clamp post in one direction and the slot opens on the clamp post in an opposite direction, and the longitudinal axis of the cantilever beam extends at an acute angle to the longitudinal axis of the clamp post so that the distal end of the cantilever beam is disposed lower than the proximal end of the cantilever beam; positioning a workpiece on the fixture plate; and engaging the workpiece with the clamp finger so as to secure the workpiece to the fixture plate.

12. A method according to claim 11 wherein the pair of opposing jaws are opened so as to allow the clamp finger to move along the clamp post so as to secure the workpiece to the fixture plate.

13. A method according to claim 11 comprising the additional steps of: withdrawing the workpiece from the fixture plate; and securing a new workpiece to the fixture plate.

14. A method according to claim 13 wherein the workpiece is withdrawn from the fixture plate by manually lifting the clamp finger away from the fixture plate.

15. A method according to claim 13 wherein the new workpiece is secured to the fixture plate by positioning the new workpiece beneath the clamp finger which has been manually lifted away from the fixture plate, and releasing the pressure on the clamp finger so that the clamp finger engages the new workpiece.

16. The workpiece hold-down clamp according to claim 1 wherein the mount is configured to selectively (i) secure the cantilever beam to the clamp post; and (ii) allow the cantilever beam to move longitudinally along the clamp post and circumferentially about the clamp post.

17. The workpiece hold-down clamp according to claim 16 wherein the mount is configured so that when the cantilever beam is moving longitudinally along the clamp post, the cantilever beam may move equally easily in either longitudinal direction.

18. A method according to claim 11, wherein the pair of opposing jaws are opened so as to allow the clamp finger to move along the clamp post so that the cantilever beam engages the workpiece, and further wherein the opposing jaws are closed so as to secure the clamp finger to the clamp post, whereby to secure the workpiece to the fixture plate.

* * * * *